(12) United States Patent
Phillips et al.

(10) Patent No.: US 11,594,163 B2
(45) Date of Patent: Feb. 28, 2023

(54) MULTIPLE-SIZED DISPLAY PRESENTATION SYSTEM AND APPARATUS

(71) Applicant: BBY Solutions, Inc., Richfield, MN (US)

(72) Inventors: Scott Phillips, Falcon Heights, MN (US); Travis Misterek, Bloomington, MN (US); Darin Michels, Hopkins, MN (US)

(73) Assignee: BBY Solutions, Inc., Richfield, MN (US)

( * ) Notice: Subject to any disclaimer, the term of this patent is extended or adjusted under 35 U.S.C. 154(b) by 109 days.

(21) Appl. No.: 17/165,994

(22) Filed: Feb. 3, 2021

(65) Prior Publication Data

US 2021/0280112 A1 Sep. 9, 2021

Related U.S. Application Data

(60) Provisional application No. 62/986,303, filed on Mar. 6, 2020.

(51) Int. Cl.
*G09G 3/20* (2006.01)
*G06Q 30/02* (2012.01)
*G06Q 30/0251* (2023.01)

(52) U.S. Cl.
CPC ............ *G09G 3/20* (2013.01); *G06Q 30/0257* (2013.01); *G09G 2340/04* (2013.01); *G09G 2354/00* (2013.01); *G09G 2370/06* (2013.01); *G09G 2370/16* (2013.01)

(58) Field of Classification Search
CPC ... G09G 2340/04–045; G09G 2340/14; G09G 2340/0442
See application file for complete search history.

(56) References Cited

U.S. PATENT DOCUMENTS

| 5,754,165 | A | * | 5/1998 | Oyashiki | ............... G06F 3/14 345/603 |
|---|---|---|---|---|---|
| 7,196,733 | B2 | | 3/2007 | Aratani | |
| 8,493,512 | B2 | | 7/2013 | Kubota | |
| 8,863,187 | B2 | | 10/2014 | Ho | |
| 2005/0162557 | A1 | | 7/2005 | Choi | |

(Continued)

*Primary Examiner* — William Boddie
*Assistant Examiner* — Bipin Gyawali
(74) *Attorney, Agent, or Firm* — James M. Urzedowski; Daniel A. Tysver (57) ABSTRACT

Systems and methods of use are presented that resize a displayed program presentation based on a requested television size, which allows a single large display monitor (television) to act as a proxy of all the smaller television sizes available in a given model line of televisions. The resized program is presented on the display monitor with a physical size larger than the requested size. Pricing information for the requested television size is superimposed on the presented resized program. Outlines for intermediate sizes of televisions of the same make and model to that of the display monitor are also presented in the presented program, including size and price indicators for the intermediate sizes. Multiple display monitors, each having a separate media player, can be implemented in a retail environment so as to allow several makes and models to be compared. Sync signals keep video transmitted by the media players synchronized.

9 Claims, 8 Drawing Sheets

(56) References Cited

U.S. PATENT DOCUMENTS

| | | | |
|---|---|---|---|
| 2005/0243212 A1* | 11/2005 | Onomatsu | H04N 5/63 |
| | | | 348/553 |
| 2008/0189365 A1* | 8/2008 | Narayanaswami | H04L 67/142 |
| | | | 709/204 |
| 2008/0235749 A1* | 9/2008 | Jain | H04N 21/6581 |
| | | | 725/38 |
| 2009/0040474 A1* | 2/2009 | Kamijima | G02B 27/48 |
| | | | 353/85 |
| 2012/0324515 A1* | 12/2012 | Dashevskiy | H04N 21/42224 |
| | | | 725/78 |
| 2014/0006155 A1* | 1/2014 | Ramirez | G06Q 30/0256 |
| | | | 705/14.54 |
| 2015/0255044 A1* | 9/2015 | Hirasawa | G06T 3/4092 |
| | | | 345/472 |
| 2016/0240170 A1* | 8/2016 | Scheepens | G09G 5/14 |
| 2017/0150220 A1* | 5/2017 | Greene | H04N 21/4586 |
| 2019/0245711 A1 | 8/2019 | Currier | |
| 2019/0333125 A1* | 10/2019 | High | G09G 5/005 |
| 2022/0095006 A1* | 3/2022 | Seed | H04N 21/41415 |

* cited by examiner

MULTIPLE-SIZED DISPLAY PRESENTATION SYSTEM AND APPARATUS

CROSS-REFERENCE TO RELATED APPLICATIONS

The present application is a utility filing claiming priority to U.S. Provisional Application No. 62/986,303, and filed on Mar. 6, 2020, the entire contents of which being hereby incorporated by reference.

FIELD OF THE INVENTION

The present application relates to the synchronization of media players for multiple presentation of video over multiple displays or televisions, and to the resizing of video content to visually present differences between differently sized displays or televisions.

SUMMARY OF THE INVENTION

Embodiments disclosed herein are directed to systems, and the components of such systems, and their collective methods of use, which allow a single television or monitor on display in a commercial environment such as a retail store (hereinafter referred to as a display monitor) to display on the display monitor's screen, images that correspond to those that one or more smaller monitors would be capable of displaying. Such a system allows a display monitor to take the place of several televisions or monitors in a retail demonstration environment.

Using such systems, the retailer need only set up and display for sale the largest display size in a model series. This reduces the amount of labor required for setting up a new television series because the retail staff does not have to interact with and set up as many products. This also reduces the margin erosion that results every time a television is put on display. Open box TVs (TVs that were previously on display) cannot be sold as new in box. This means that consumers must receive a discount in order to be incentivized to buy these televisions. Not having to take multiple TVs in a model/series out of the box for display purposes reduces this cost. In addition, reduced handling of televisions outside of their boxes will reduce the amount of damage that is incurred from such handling. Furthermore, by reducing the number of televisions on display, the retailer reduces power consumption since a display monitor that represents multiple sizes will consume less power than displaying multiple different televisions in the same model/series. Furthermore, the retailer using the system of FIG. 1 saves a great deal of display space, which can be used to display a broader selection of merchandise or to display larger televisions than would otherwise be possible.

This same system also provides numerous benefits to end user customers. The customer is able to immediately see the differences in watching the same content on different size screens. The relative sizes and prices of the different screen choices are also immediately apparent. Furthermore, the ability of the user to select desired content, and to test the features of the television by selecting content that tests the processing capabilities of the television in different ways will greatly enhance the ability of users to evaluate and compare televisions.

In some embodiments, the display monitor is connected to a media player and a touch controller user interface. In at least one embodiment, the media player is incorporated directly into the display monitor.

The media player contains visual, and in some cases audio, programming in different forms and formats corresponding to the capabilities of the display monitor, as well as to one or more smaller monitors, by screen size, of the same model line as the display monitor.

The touch controller provides a user interface that a user may utilize to select the screen size of the model of monitor that they would like displayed on the screen of the display monitor. The user may then select the type of media programming (movie, computer game, television program, audio file, etc.) and its resolution format (8K, 4K, HDTV, 1080p, etc.) corresponding to that of the capabilities of the selected model that the user would like displayed on the screen of the display monitor and/or emitted by its built-in speakers of (or externally connected speaker system if applicable).

In some embodiments, the media player is programmed to display on to the screen of the display monitor one or more bordered frames, or outlines, that demark the relative screen sizes of the other monitors that the media player can provide media for.

In some embodiments, the system includes a computer network and server, through which the medial player and touch controller may be provided with updated pricing, monitor specifications and/or other information.

In some embodiments, the system includes multiple display monitors, each corresponding to different monitor brands or model lines. In at least one embodiment, the respective media players that connected to each of the display monitors are controlled by a single touch control. In at least one embodiment, the respective media players connected to each display monitor are in communication with a media source and synchronization server (sync server). The sync server is configured to provide each of the media players with identical media programing, and to synchronize the display of the identical media programming to each of the display monitors in the absence of customer input to a given touch controller.

In some embodiments, the system includes one or more mobile devices that are in wireless communication with each media player and touch controller. In at least one embodiment, the touch controller is configured to detect the proximity of a mobile device. In at least one embodiment, each of the mobile devices has a user interface corresponding to that of the touch controller. In at least one embodiment, a mobile device is provided with additional functionality over that of the touch screen. In at least one embodiment, a mobile device is configured to supersede commands given to a media player by the touch screen.

These and other embodiments are described in greater detail below and are depicted in the figures included herewith.

DETAILED DESCRIPTION

As mentioned above, embodiments of the system described herein are intended for use in a commercial environment, such as a retail store where televisions and/or monitors are displayed for sale. The words television and monitor are used interchangeably herein.

Figure 1:
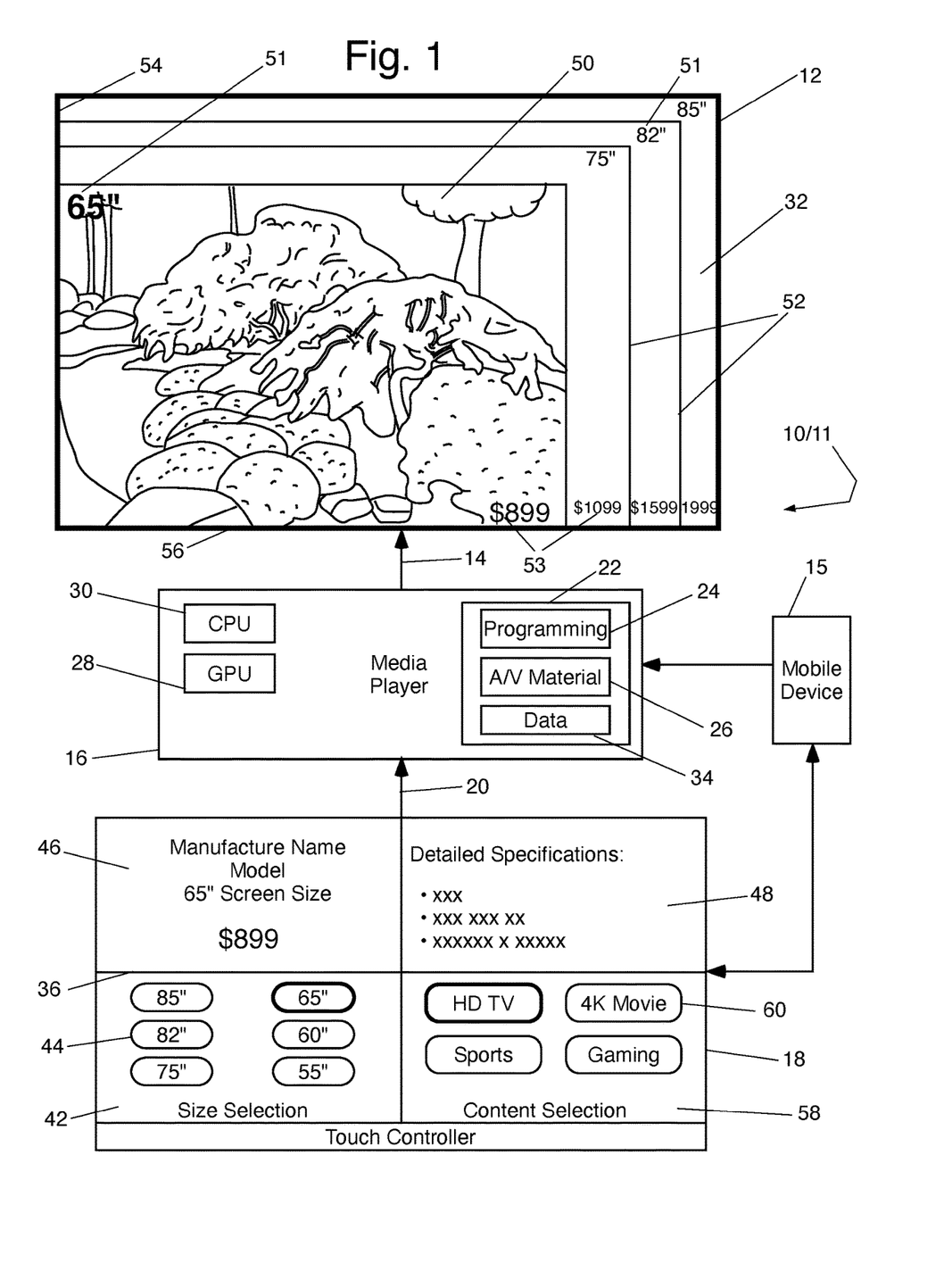
FIG. 1 is a schematic view of a single display monitor, media player, and touch controller of an embodiment of a system used by the present invention.

FIG. 1 shows an embodiment of system 10, comprising an assembly of a single display monitor 12, in communication with a media player 16 and a touch controller 18 and an optional mobile device controller 15.

In the embodiment shown, the display monitor 12 receives video and/or audio input from a media player 16 connected to the display monitor 12 via the connection depicted as arrow 14. The media player 16 is connected to a touch controller 18 via the connection depicted as arrow 20. The media player 16 receives instructions and control signals from the touch controller 18 via the connection 20. In some embodiments, a mobile control device (mobile device) 15 is in wireless communication with one or both of the media player 16 and the touch controller 18. The mobile device 15 provides third-party control of the media player 16 and/or touch controller 18 and may also provide additional functionality to the system 10, as is discussed in greater detail below. In some embodiments the mobile device 15 is configured such that it overrides commands to the media player 16 sent from the touch controller 18.

FIG. 1 also depicts internal components of the media player 16. The media player 16 includes a digital storage or memory 22 that contains programming instructions 24 and audio-visual media 26. The media player 16 may have media 26 in the form of movie material, television material, sports material, captured video from a video gaming session (gaming material), and songs or other audio materials. In at least one embodiment, the media player 16 contains the audio-visual media 26 in a variety of formats such as HDTV format, 4K format, 8K format and/or other formats.

In addition to storage, the media player 16 has processing capabilities. In one embodiment, the media player 16 has a video or graphics processing unit (or GPU) 28 to handle video processing as well as a standard central processor unit (or CPU) 30. The overall operation of the media player 16 is under the control of the central processing unit 30. The media player 16 receives requests from the touch controller 18 to output particular media material 26 to the display monitor 12.

In one embodiment, the media material 26 is output from the media player 16 to the display monitor 12 via any of a variety of connections (as indicated by arrow 14), including wireless connection, HDMI connection, or other. In the case of an HDMI connection, the HDMI connection 14 is configured according to one or more HDMI standards. These standards change over time in order to support more complex video and audio formats. For instance, the 2.0 HDMI standard supports 4K video at 60 Hz, the 2.0a standard supports HDR video, while the 2.1 standard supports 4K and 8K video at up to 120 Hz. In the preferred embodiment, the media player will support the latest HDMI standard in use by the televisions that are currently available for sale. The system 10 also works with non-HDMI video communication standards either currently in existence or developed in the future.

The programming 24 on the media player 16, is capable of using the GPU 28 or other on-board processing power to scale the stored audio-video material 26 to different sizes corresponding to different select monitor screen sizes, and then output the scaled audio-visual material 26 to the display monitor 12 where it is then displayed on a portion of the display monitor's screen 32 that corresponds to the select monitor screen size. The programming 24 is further capable of inserting the scaled video material into a video stream that is presented to the display monitor 12 in the same manner. The programming 24 is also capable of inserting text and graphics into the video stream in addition to the scaled video material.

The media player 16 memory 22 also contains and/or has access to monitor data 34 concerning the display monitor 12 to which it is connected, as well as those makes and models of televisions that the display monitor 12 is capable of acting as a display proxy on behalf of.

Figure 2:
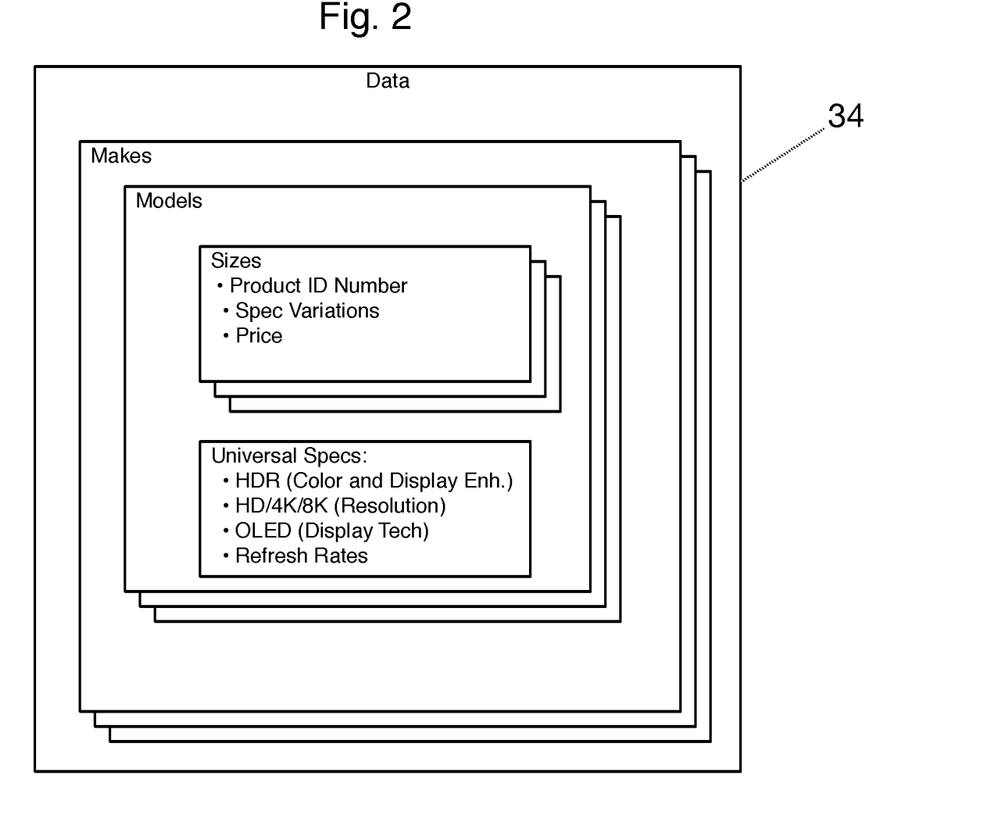
FIG. 2 is a schematic view of the data used by the system in FIG. 1.

FIG. 2 shows schematically the type of data 34 that can be contained in memory 22. This data 34 can include the make/manufacture and the model/series of all the televisions that the display monitor 12 can be called upon to display on the screen 32 of the display monitor. For instance, the display monitor could be a Samsung Q70 series television (from Samsung, Seoul, South Korea). The data 34 includes information about the various sizes of televisions that are made for a particular make and model. For example, one television manufacturer might make a single model of their television available in sizes (measured diagonally) of 65", 75", 82", and 85". FIG. 2 shows that information about a particular model of a television includes information about all sizes available for that model. For each size, the data 32 may indicate a product ID or SKU number for that make, model, and size; a price at which a particular retailer is currently selling that make, model, and size; as well as specification information that might vary between sizes in a model. In addition, the data 32, as shown in FIG. 2, indicates that there are universal specifications that are shared across all display sizes of a model. These universal specifications may indicate the color capabilities of the model (such as whether the television handles HDR signals) and may indicate the resolution of the model (such as whether this is an HD model, a 4K model, or an 8K model). The specifications may also indicate the display technology used for the model. For example, some televisions use OLED technology, while others use more standard LED/LCD technologies. In addition, some televisions are able to handle different/higher refresh rates than others. Note that the universal specification data may be the default specifications for that model, while the data specific to a particular size can be used to note any size-based variations from these universal specifications.

The media player 16 is able to modify its output (e.g., the HDMI output) signal to the display monitor 12 to match the specifications of that physical monitor's make, model, and size. If the data indicates that the display monitor 12 can accept a 4K stream of data on the output, the media player 16 will provide that data stream when possible. In other words, the media player 16 will generally attempt to match the most advanced capabilities of the attached display monitor 12. In some embodiments, the media player 16 will not up-sample audio-visual material in order for a user to visually see how well the display monitor is able to handle an image stream having a lower-than-possible resolution.

The HDMI standard allows an attached device (such as media player 16) to query the display monitor 12 to determine which features are supported by that display (through Extended Display Identification Data, or "EDID," abilities). In one embodiment, the media player 16 obtains data 34 from an external source or server 70 (as explained below, see also FIGS. 4, 7 and 8) and uses this data 34 to select the video and audio format transmitted to the display monitor 12. In another embodiment, the media player 16 receives data 34 over the HDMI signal, and then uses this data 34 to match the capabilities of the display monitor 12. In a third embodiment, both data sources are used to identify the capabilities of the display monitor 12.

The media player 16 receives input from the touch controller 18. In at least one embodiment, the touch controller 18 comprises a touch screen interface 36 that both accepts input from the user and provides a data interface (a GUI) to the user. In FIG. 1, the user interface of the touch controller is shown (as opposed to the internal elements of the touch controller 18, as was shown for the media player 16). This interface is presented on the touch screen display 36 of the touch controller 18. In another embodiment, however, the touch controller 18 contains physical or touch buttons but does not include an alterable display interface to the user.

The system 10 of FIG. 1 allows a user to use the touch controller 18 to instruct the media player 16 to change the video displayed on the screen 32 of the display monitor 12. In one embodiment, the system 10 is used in a retail environment in order to display information about televisions or monitors that are being sold. One system 10, comprising display monitor 12, media player 16, and touch controller 18 is used for each model series made by a manufacturer that is being sold by the retailer. The system 10 allows the retailer to require only a single display monitor 12 to display all of the potential sizes of televisions available within a given model series, rather than having all sizes of that model on display.

The user interface 36 presented on the touch controller 18 allows the user to change what is being presented on the display monitor's screen 32 so as to represent a desired size of that television model. In FIG. 1, an embodiment of the touch controller 18 is shown having a touch screen user interface 36 that is divided in to four quadrants of separate commands that the user may select from.

Starting with a first or size selection quadrant 42 at the lower left of the user interface 36, here the touch controller presents six different command "buttons" 44, which correspond to the available sizes of the current make and model television that system 10 is capable of presenting on the single screen 32 of the display monitor 12. In this embodiment, there are six size select buttons 44, corresponding to 55", 60", 65", 75", 82", and 85" television screen sizes.

The upper-left quadrant of the interface 36 is a basic informational display quadrant 46, where basic information such as pricing, screen size, television make and model, etc. of the currently selected and displayed screen size is provided to the user.

The upper-right quadrant of the interface 36 is a detailed informational display quadrant 48. The information for this quadrant can be taken from the data 34 that is stored in the memory 22 of the media player 16 and shown in FIG. 2. Selected details of this stored data 34 that is related to the universal specifications for this make and model, as well as specification variations for the selected screen size may be displayed here.

In the embodiment shown in FIG. 1, the 65" size has been selected on the touch controller 18, via the corresponding size select button 44 (highlighted). When a user selects a certain size (such as 65"), the touch controller 18 will instruct the media player 16 to present on the display monitor screen 32 a presentation 50 representing that size of television. In FIG. 1, the actual screen size of the display monitor 12 is 85" diagonal, which is the largest size of that make and model sold by the retailer. Because the user has expressed an interest in the 65" model by selecting it from the touch controller interface 36, the displayed presentation 50 is provided with media content that has been dynamically resized by the media player 16 to be the same size as would be produced by an actual 65" television. In other words, the media player 16 is programmed to recognize that the current television has an 85" diagonal. The media content that is featured on the selected 65" display presentation, and which is selected from the media material 26 is resized proportionally so that the resulting image that is shown on the actual 85" display monitor screen 32 will be the same size as it would be if shown on a physical 65" television. The resized image of the display presentation 50 will fill only a portion of the television signal sent on the HDMI input 14 to the actual 85" screen 32. This reduced size video image is pushed into the lower left corner of the displayed presentation 50, as shown in FIG. 1.

In this way, the media player 16 resizes the image displayed on the display monitor 12, so that the resulting presentation shows the audio/visual programming at the size it would be on a physical television of the size selected on the touch controller 18. In some embodiments, the media player 16 superimposes or overlays a text size indicator 51 of the selected image size (65") on the upper left portion of the resized display presentation 50, and also displays as text the price charged 53 by the retailer ($899) for that size of this make and model television in the lower right portion of the display presentation 50.

In some embodiments, the media player 16 also modifies the image stream sent to the display monitor 12 so as to show graphically superimposed lines or variant borders 52 appropriately placed on the display monitor screen 32 to indicate upper and right sides of the larger available television screen sizes between the selected size (65") and the actual physical size (85") of the display monitor 12. In this case, the media player 16 creates variant borders 52 for the 75" and the 82" sizes. These variant borders 52 are placed so that they, along with the left 54 and the bottom 56 of the display monitor screen 32, outline the display sizes of the 75" and 82" televisions when they are displayed on the screen 32 of the 85" display monitor 12. The media player 16 then superimposes text indicators 51 of these sizes (75" and 82") and the prices 53 charged by the retailer for those sizes ($1,099 and $1,599) on the upper right and lower right corners of these variant borders 52, respectively, as shown in FIG. 1. The media player finally superimposes the text indicators 51 of full size of the television ("85") and the price 53 charged by the retailer for the actual television on display ($1,999) in the upper right and lower right corners of the display monitor screen 32, respectively. In this manner, the smaller screen sizes of televisions available for purchase from the retailer, for a television model/series will be represented on the largest TV (the display monitor 12) in that series available for purchase by scaling the display presentation 50 down to demonstrate the smaller screens of those other televisions that are available.

Returning to the user interface 36 of the touch controller 18, a lower right quadrant of the touch controller interface 36 is a media or content selection quadrant 58, which includes several media selection or content buttons 60 that correspond to a variety of sampled audio-visual programs of the media materials 26 stored on the media player 16, for display on the screen 32 of the display monitor 12. Each media selection button 60 allows a user to choose a different example of audio-visual materials 26 for display on the featured display presentation 50 as selected via the screen size selection buttons 44. As shown in the embodiment depicted in FIG. 1, the user can select between an HD television signal (perhaps using a resolution of 1080p), a 4K movie stream, sports programming, and an example (video capture) from the playing of a video game. Selecting one of these buttons 60 will highlight the button and will inform the media player 16 to select the appropriate audio-visual material 26 from its storage. As explained above, this material will be scaled and modified to create the display presentation 50 shown on the screen 32 of the display monitor 12.

The selection of different audio-visual material 26 not only allows a user to evaluate the television using the type of programming that the user enjoys most, it also allows the user to see how the television handles different inputs having different specifications. For instance, even if the movie content is available in 4K, only a 4K television will be able to handle this input. If the television is 4K, the user may be able to directly compare how much having a 4K video source improves the quality of the television by comparing the quality of the 4K movie content with the HD TV content. Similarly, sporting events content can frequently be enhanced by a television having a higher refresh rate through interpolation. Some television models are automatically able to activate interpolation (motion blur) settings based on the type of content being presented. Allowing the user to select sporting content, which can trigger automatic interpolation, allows a user to see these technologies in action with a push of a button.

Similarly, gaming content is frequently best viewed at a very high frame rate. Some gaming systems such as the Xbox One X (manufactured by Microsoft corporation of Redmond, Wash.) are capable of generating 120 Hz content. This content can be stored on the media player in a 120 Hz format and be made available to the television if the television is able to process that input. If not, the same content can be stored in 60 Hz format for presentation, or the media player can be programmed to reduce the 120 Hz content to 60 Hz for presentation to those televisions. By providing this content, the user is able to see how well this television model can handle this type of input.

In some embodiments, test patterns and other test content will also be made available to show differences in the video processing capabilities of the televisions. In some embodiments, certain content (such as test patterns and other test content) is only available to staff working at the retailer where the system 10 is in use. The staff members can assist customers by presenting these test patterns and then explaining to the user how to interpret the displayed results. To restrict access to certain content, the user interface 36 of the touch controller 18 can have a login feature that provides additional options for staff members that successfully log in.

In other embodiments, the staff can carry mobile devices 15 that trigger additional features in the touch controller when the touch controller senses the proximity of a staff member's mobile device 15.

In a still further embodiment, the mobile device 15 carried by staff could be capable of directly interfacing with the media player 16. The user interface of the mobile device 15 would then allow the staff member to control the media player 16 directly in the same manner as the touch controller 18. Additionally, staff only selections such as the ability to show test patterns could be added to this mobile device control interface. This mobile device 15 could be presented by a specialized app operating on the mobile device.

Figure 3:
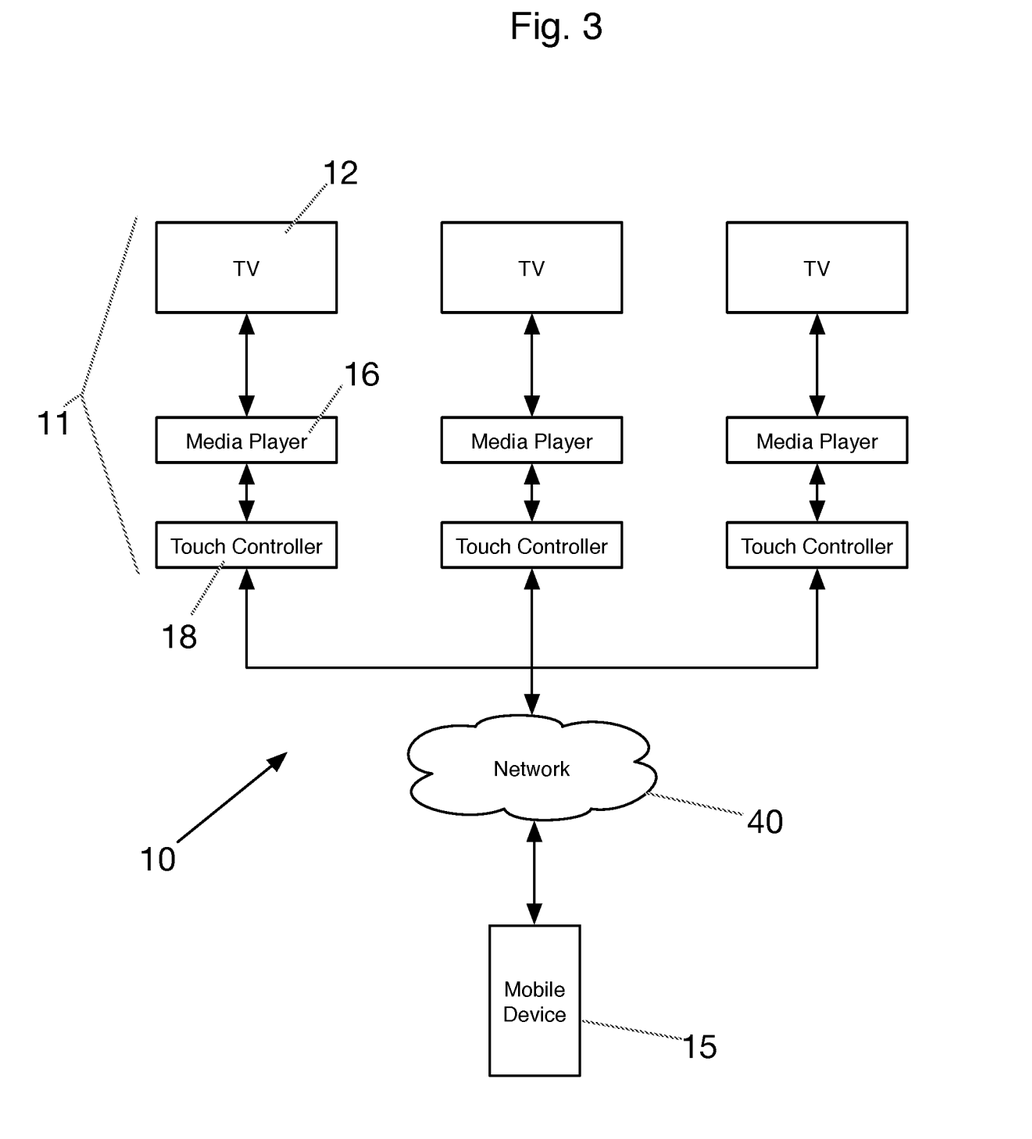
FIG. 3 is a schematic view of an embodiment wherein a plurality of combined display monitor, media player, and touch controllers such as are shown in FIG. 1 are connected via a network.

In some embodiments of the system 10, an example of which is shown in FIG. 3, several assemblies 11 of individual display monitors 12 and their corresponding media players 16 and touch controllers 18 are present in a retail environment with each assembly 11 of display monitor 12, media players 16 and touch controller 18 corresponding to a different brand and/or model of television available for purchase. In such environments/embodiments of system 10, the mobile device 10 may be equipped with a feature that allows the staff member (this feature could also be exposed to customers) to select all of the display monitor/media player combinations for control, or individually selected combinations. The mobile device 15 would be given access to all media players 16 in a retail location by connecting the mobile device to the network 40 on which the touch controllers 18 communicate with the media players 16. This connection could be completely wireless or could involve a bridge between a wireless communication with multiple mobile devices and a wired network connecting the media players 16 and touch controllers 18. In one embodiment mobile devices 15 could also connect to the media player 16 through the internet (WAN) without being connected to the same physical network (LAN).

Figure 4:
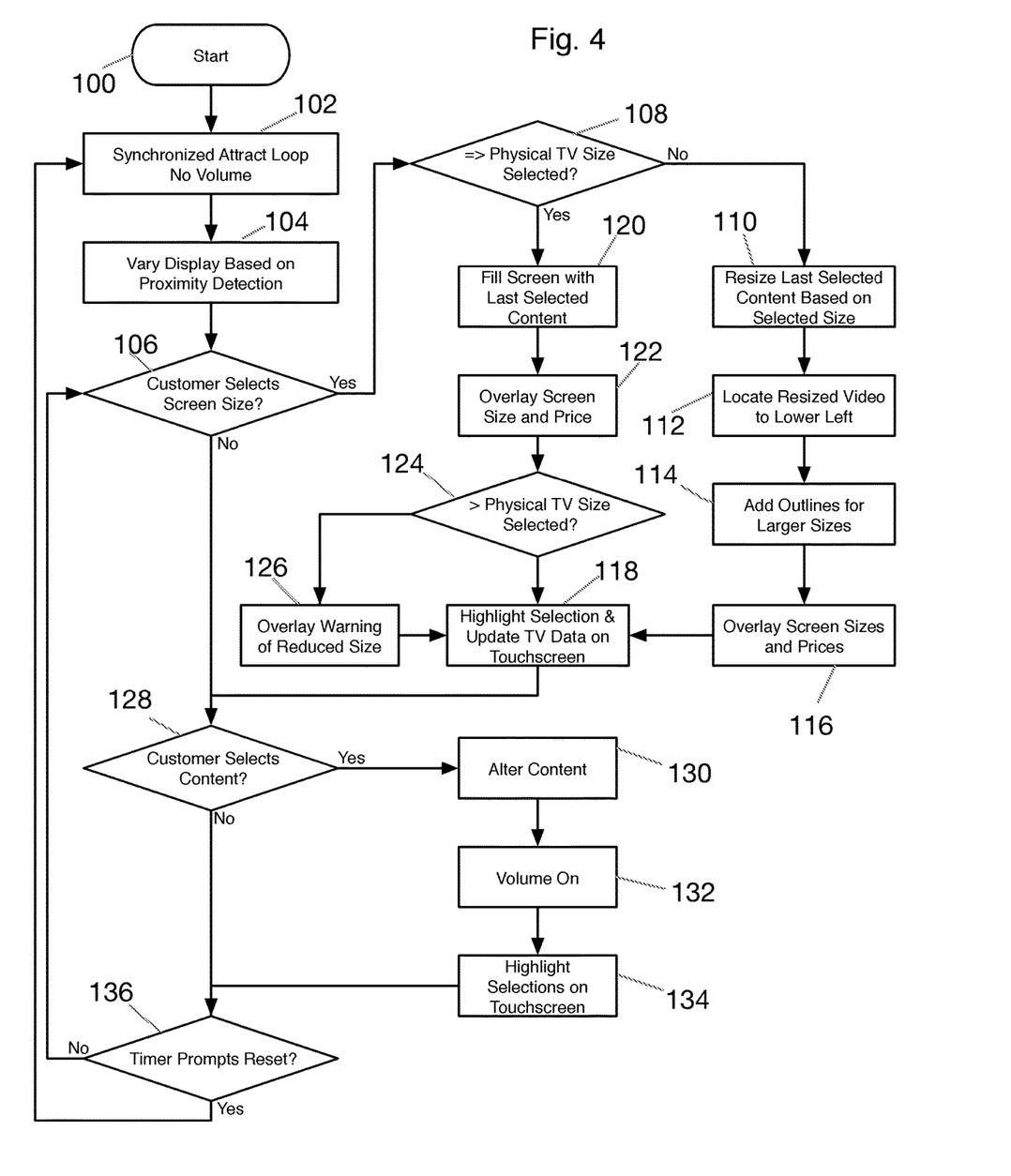
FIG. 4 is a flow chart showing a process of using the systems of FIGS. 1 and 3.

FIG. 4 shows a method for using the systems of FIG. 1 or FIG. 3 with references to the components of those systems shown. At step 100, the method starts. At step 102, the media player 16 providing an attract loop of audio-visual material for display on the display monitor 12. As explained further below, if multiple assemblies 11 are used at a retail store, it can be beneficial to have all display monitors 12 showing the same attract loop in synchronization. In some embodiments either the media player 16 or the touch control 18 can include a proximity sensor so as to change the attract loop once a customer is identified as being close to the system. When the customer has been detected at step 104, the programming 24 of the media player 16 interrupts the attract loop in order to further attract the attention of the nearby customer. In at least one embodiment, no sound volume is included in the video presentation streamed to the television when in the system is merely trying to attract customer interactions in these preliminary steps.

At step 106, the customer begins use of the system 10, by selecting one of the screen size buttons 44 in the screen size select quadrant 42 of the touch controller interface 36. This selection will be communicated to the media player 16. At step 108, if the selected size is less than the physical size of the screen 32, the media player 16 will resize the default (or the last selected) content so that the displayed presentation 50 of the content on the display monitor 12 will match the physical size selected by the user, as shown in step 110. At step 112, the media player provides the displayed presentation 50 such that it is located to the lower left of the screen 32 of the display monitor 12. At step 114, outline lines or variant borders 52, as described above are then created for any intermediate screen sizes between the selected size and the screen size of the display monitor 12. At step 116, screen size indicators 51 and price indicators 53 are then overlaid on the video presentation, and the video presentation is provided to the display monitor 12.

At step 118, on the touch controller 18, the selected button 44 is highlighted, and the information displayed on the basic informational quadrant 46 and detailed information quadrant 48 of the user interface 36 are both updated to show the price and specification for the selected television size.

Returning to step 108, if the customer selected the same size as the physical screen size of the display monitor 12 (the 85" size in FIG. 1), then, as shown in step 120, the screen 32 is completely filled with the last selected (or default) content, and at step 122, the screen size 32 and price for that model are then overlaid on the presentation shown on the screen 32. The touch controller 18 is then updated for this size.

In some embodiments, it is possible to list a size that is larger than the physical television that forms part of the system. If this is allowed, and the user, at step 124, selects a larger size, the method effectively works the same as if the actual physical size of the television were selected by the user, with the addition of a warning that is superimposed on the television presentation, at step 126. This warning tells the consumer that they have selected a size larger than the displayed size, and the pricing information is for the selected television of the larger size (such as "You have selected a 90" model, but this display model is an 85" television—your selection would be XX % larger than this television").

The method of FIG. 4 also allows a user to select content. At step 128, if the user selects one of the content buttons 60 in the media selection quadrant 58 of the user interface 36, the touch controller 18 provides this information to the media player 16. At step 130, the media player 16 changes the audio-video material being presented but does not reset the selected size. Thus, if the system were presenting a 65" size as shown in FIG. 1 when the content selection button was pressed, the audio-video content would change but the resizing for showing a 65" screen would continue unchanged.

If the content being sent to the display monitor 12 (or connected speaker(s)) from the media player 16 includes an audio component, the default volume of the audio component is zero or muted. In some embodiments, audio component being sent to the display monitor 12 would turn on for the customer only after the customer changes the media selection via the content buttons 60 of the user interface 36. Thus, if the user merely approaches a system in the attract loop and changes the screen size, the volume on the television would remain muted or at the default state. At step 132, if the user changes the content, via buttons 60, the sound output would be activated as appropriate to the video content selected and displayed on the screen 32. In other embodiments, the sound output is activated temporarily whenever the user interacts with the system.

Finally, at step 134, the touchscreen 36 would be updated to represent the selected media content. This can be as simple as highlighting the pressed content selection button 60. In FIG. 1, the HDTV content button 60 is highlighted as shown by the bold/thicker outline around that button. Any technique for visually distinguishing the selected button could be implemented for the buttons of the touch controller, such as highlighting, bolding, illuminating or changing the colorization of the button 60. In some embodiments, the technical specifications of the content will be presented on the user interface 36 of the touch controller 18. For instance, if the gaming content were presented, the touch controller may indicate that gaming content can have a refresh rate as fast as 120 Hz, but since this current model is only capable of 60 Hz only a 60 Hz video signal is being presented to and displayed on the television. If the 4K movie button were pressed, the touch controller could explain that the 4K content being displayed has a higher resolution than normal HD TV signals, and that the television is capable of and is currently using HDR technology to improve the luminance and color of the picture.

The last step of the method shown in FIG. 4 is a timeout step 136. A timer determines how long it has been since the last user interaction with the touch controller 18. If a certain time period has passed without interaction (such as 45 seconds or two minutes, etc.), the timer can trigger a reset back into the attract loop mode. As explained below, this would also trigger the media player to re-synchronize with other televisions on display at the retailer. If the time period has not passed, the method would continue displaying the selected content at the selected size and would await the next input from the user.

Figure 5:
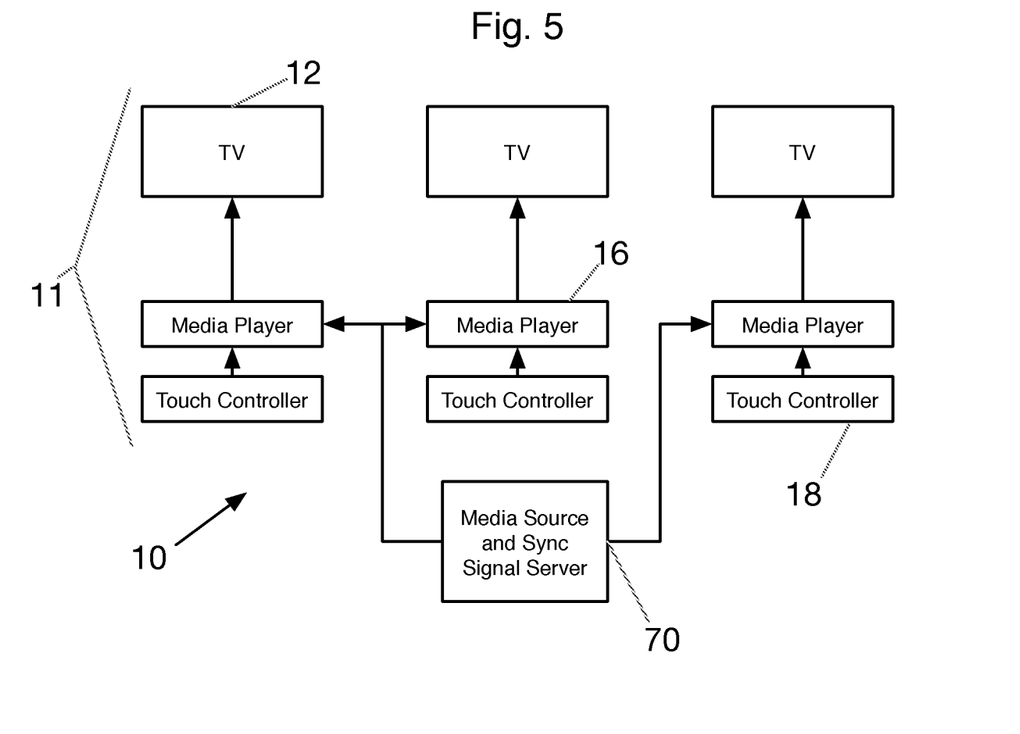
FIG. 5 is a schematic view of a plurality of display monitors, media players, and touch controllers kept in synchronization with common video media using a media source and sync signal server.

FIG. 5 shows an embodiments of the system 10 in a retail environment having a plurality of assemblies 11 like that shown in FIG. 3. Each assembly has a single display monitor 12, a dedicated media player 16, and a dedicated touch controller 18. In this case, the media players 16 are also in communication with a media source and sync signal server 70. This communication can take place over a network 40 (such as is represented in FIG. 3), such as a local area network (or LAN) or a wide area network (or WAN). The Internet is an example of a wide area network. This communication can take place via a wired connection (such as through an Ethernet network) or a wireless connection (such as a WiFi connection). The media source and sync signal server 70 can provide content to each of the media players 16. By having a central source for the content, a retailer can ensure that all of the content on the media players is identical. The media players 16 can pull this content from the server at regular intervals to ensure that updates are received. Alternatively, the server 70 can push updated content to the media players 16.

The media source and sync signal server 70 also provide a heartbeat or sync signal to each of the media players 16. This allows the media players 16 to be synchronized in terms of their default media content delivered to their respective display monitors 10, such as during the attract loop (see step 102 of FIG. 4). The media players 16 use this sync signal to trigger the playing of the attract loop video on their attached display monitors 12. This allows all of the display monitors 12 on display at the retailer to display the same video presentation simultaneously, even though each display monitor 12 is actually receiving the video signal from a separate source (namely their attached media player 16). The sync signal can be transmitted over a network connection or through a connection dedicated to the sync signal.

In FIG. 5, each of the touch controllers 18 is in direct communication with their media players 16. This communication can be a wired communication, and this wired communication can either take the form of a serial connection or a network connection. The serial connection might take the form of a direct RS232 serial connection, or a serial bus such as USB.

Figure 6:
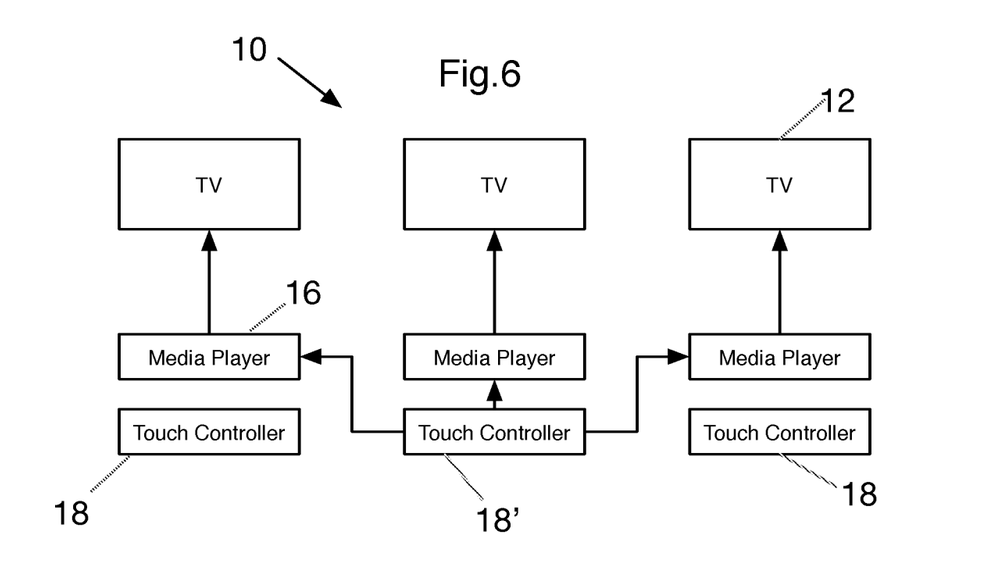
FIG. 6 is a schematic view of a single touch controller controlling the media players of three different display monitors.

If the connection between the touch controllers 18 and the media players 16 is something other than a direct serial connection, it is possible to configure the system so that one touch controller 18' can temporarily control multiple media players 16 in order to perform a direct comparison of televisions. This is shown in FIG. 6, where the central touch controller 18' is now controlling all three media players 16 shown in the embodiment depicted. During this temporary state, the touch controllers 18 normally assigned to the left and right media players 16 will not provide any inputs and should inform potential users that the attached display monitor 12 is currently being used for comparison purposes by another touch controller 18'.

Figure 7:
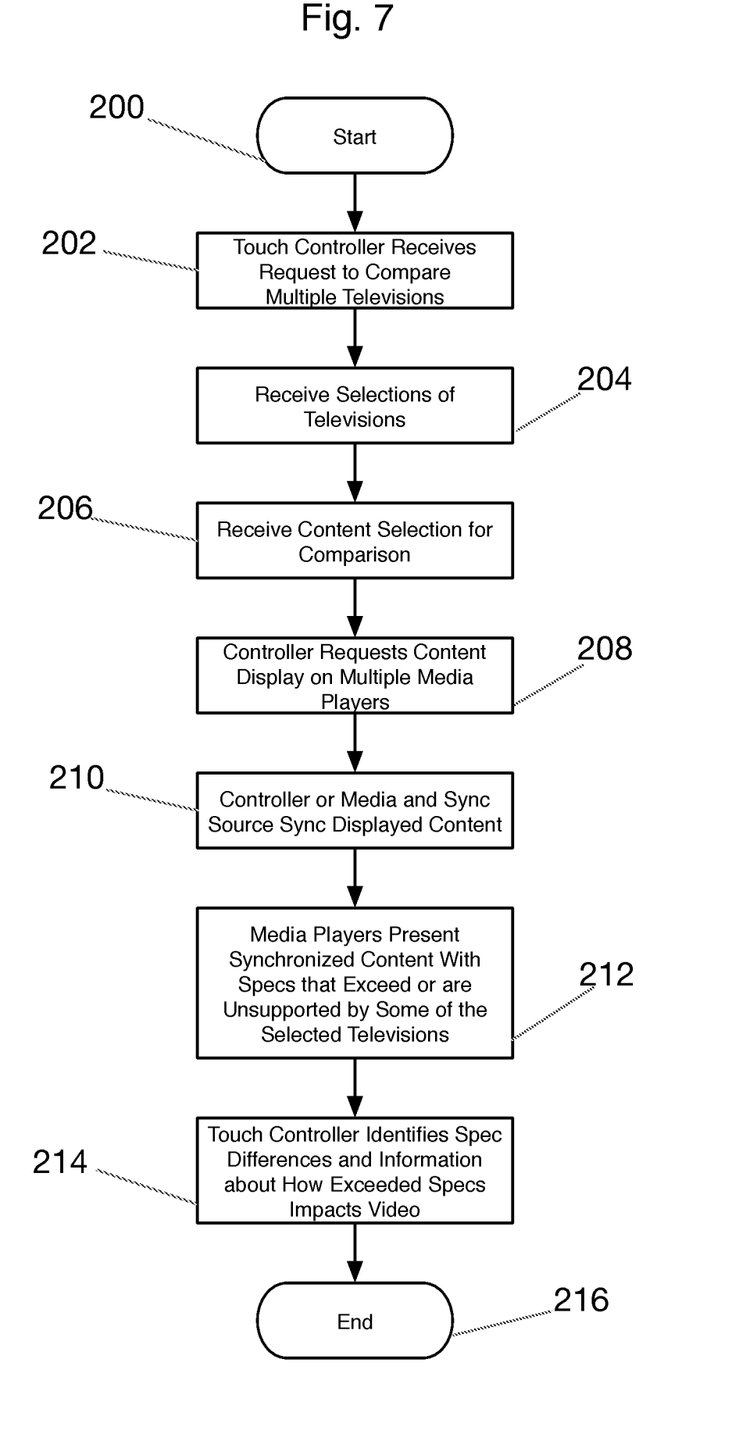
FIG. 7 is a flow chart showing a process of using the system of FIG. 6.

The method for performing this type of television comparison is shown in FIG. 7 with references to the components shown in FIG. 6 and FIG. 1. Starting at step 200, this method begins with the touch controller 18' (such as the central touch controller in FIG. 6) receiving a request to compare multiple display monitors 12 at step 202. A user could make this request by simply pressing a "perform comparison" button on the user interface 36 of the touch controller 18 (not shown). The user would then be able to select televisions for the comparison at step 204. In one embodiment, only close or adjacent display monitors 12 could be selected for the comparison so that a single user can adequately view the televisions being compared without having to walk around a retail store. Once the selection is made, the controller 18' will request and receive permission to temporarily take over control of the media players 18 attached to the requested televisions. In one embodiment the comparison could also be initiated from a mobile device 15.

At step 206, the user would then select content to be displayed on all of the display monitors 12 simultaneously. Once the content is selected, the touch control 18', at step 208, will request that the media players 16 of the selected display monitors 12 begin playing the selected content. It would be useful to have the content be played on a loop and in sync. This synchronization can be performed using a heartbeat or sync signal in the same manner as described above in connection with the attract loop. At step 210, this signal is be sent by the master touch controller 18' to all of the controlled media players 16. Alternatively, the sync signal used could be generated by the sync signal server 70 described in connection with FIG. 5 or by one of the selected media players 16. In one embodiment, the actual attract loop sync signal is used in the context of FIGS. 6 and 7 to sync the comparison audio/video content.

In the preferred embodiment, the content presented across the multiple display monitors 12 will emphasize the technical differences between the televisions. As a result, it would be preferred if the content utilized features or specifications that aren't supported by all of the televisions. For example, at step 212, requested content from the media players 16 may include HDR color instructions sent to three display monitors 12 in sync, but only two of the display monitors 12 might be capable of displaying this HDR content. The touch controller 18' that is controlling the comparison could then present information on its interface 36 that highlights these differences. At step 214 the touch controller 18' might indicate that the selected source includes HDR, but the left display monitor 12 is not able to display this enhancement. In some circumstances, the media players 16 themselves might superimpose differences onto the display presentation 50 presented on the screen 32 of the display monitor 12. In this case, the left display monitor 12 will display a message that it is the only television in the comparison that is not able to display the HDR enhancement.

Although not shown in FIG. 7, the user could change the content being displayed on the comparison televisions, and even the selected size, during the comparison. If the user selects the gaming content, the right most media player 16 may superimpose a message onto its display monitor screen 32 that it is the only television that is able to handle a 120 Hz signal from a gaming system. At step 214, this information is presented on the master touch controller 18'. The user could then compare the outputs of the three display monitors 12 to determine whether or not the 120 Hz input feature of the right-most display monitor 12 is important and relevant enough to that customer to justify any price difference. Once the comparison is completed to the user's satisfaction, the comparison ends at step 216 and the assemblies 11, including touch controller 18', return to their default control states.

Figure 8:
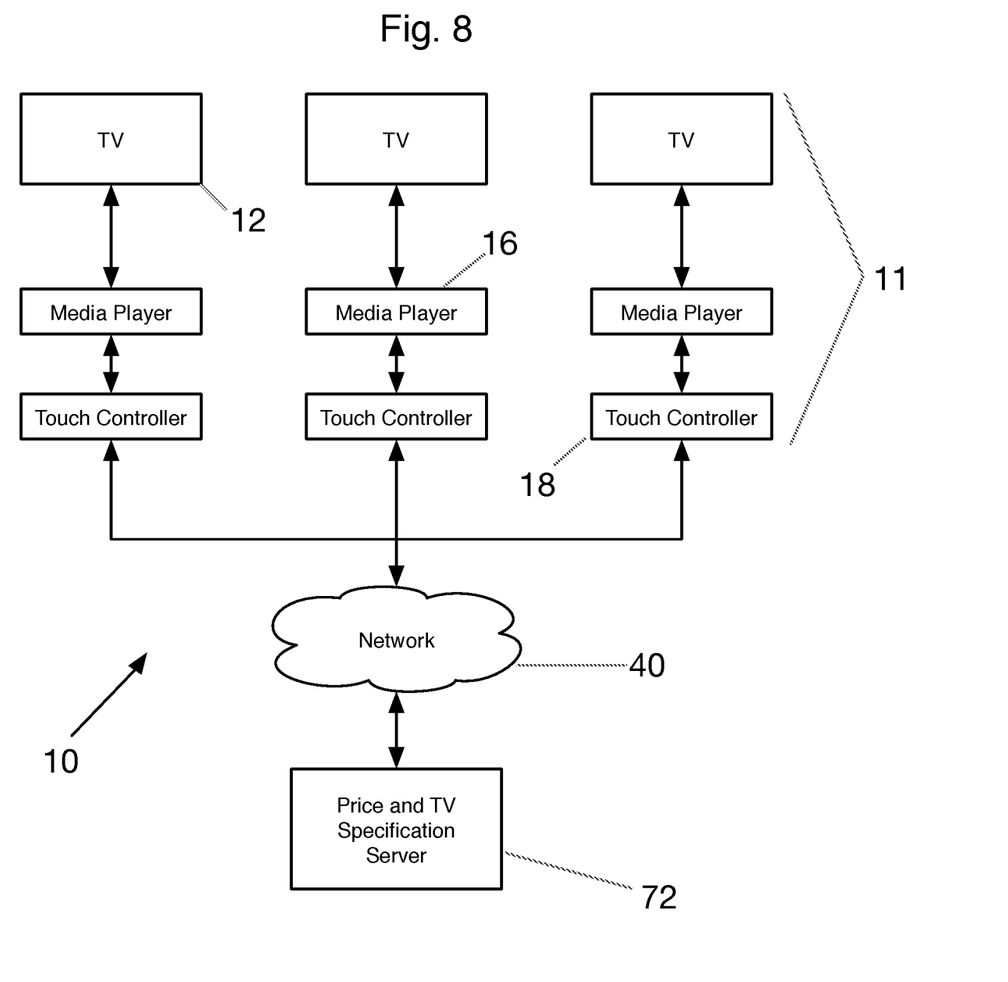
FIG. 8 is a schematic view of the televisions, media players, and touch controllers of FIG. 5 receiving data over a network from a price and specification data server.

FIG. 8 shows the touch controllers 18 of each assembly 11 and the media players 16 accessing a price and TV specification server 72 over a network 40. The price and specification server 72 may, in some embodiments, be the same server as the sync signal server 70 or a separate server. In at least on embodiment, pricing and specification data 34 (as shown in FIG. 2) for the different television makes and models are stored locally on either the media player 16 or the touch controller 18. The data 34 could also be stored on both devices. One embodiment requires that each assembly 11 (via media player 16 for example) periodically communicate with a centrally located server 72 to download and update pricing and specification data. In this manner, sales prices made at a central location would be immediately available on all assemblies 11 at all retail locations/stores. It is also possible for each store to have a device that stores the data for all media players at the store, with that device periodically updating its information from a central location for an entire retailer network.

Figure 9:
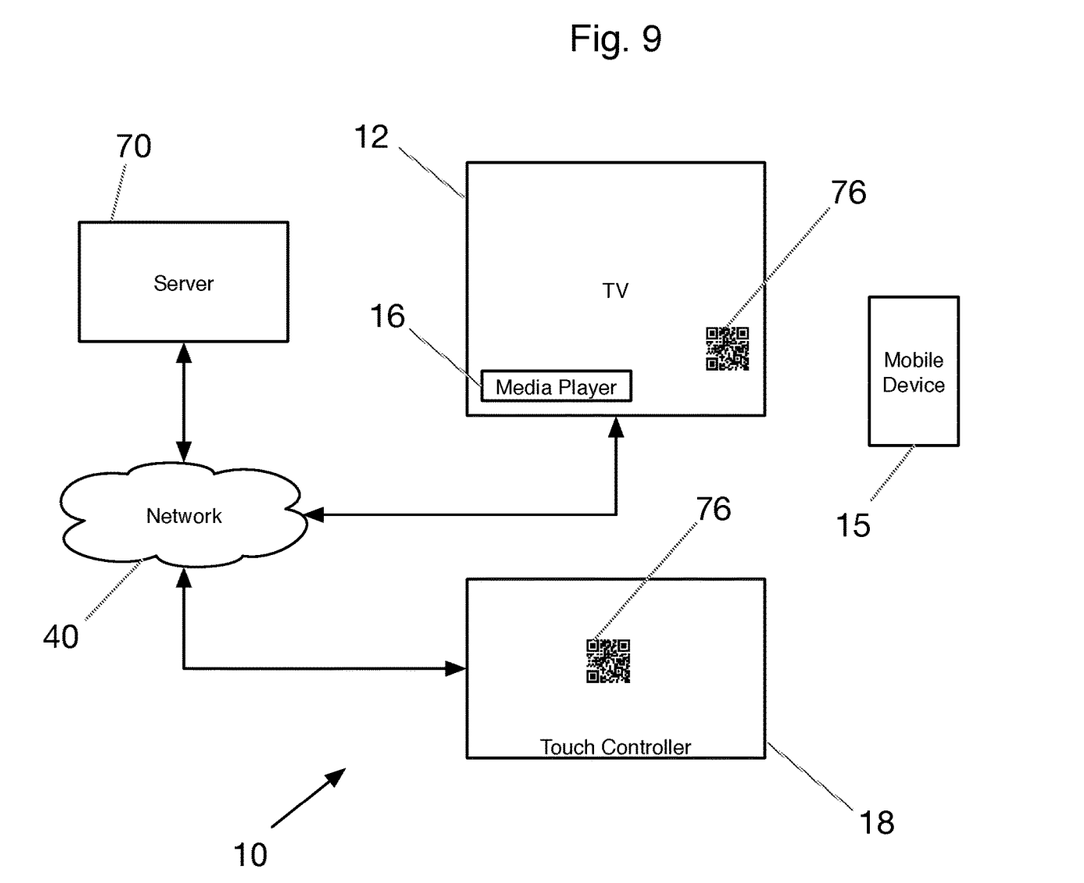
FIG. 9 shows a second embodiment where a media player is incorporated into a display monitor, and the touch controller and the media player communicate via a network and are synchronized via visual codes.

FIG. 9 shows a media player 16 that is incorporated directly into a display monitor 12 by a television manufacturer. The media player 16 stores audio-video material 26 in the same manner as the media player of FIG. 1. The media player 16 is also under control of a touch controller 18, just like FIG. 1. However, it may prove difficult to create a direct (e.g., serial) connection between the touch controller 18 and the built-in media player 16. The display monitor 12 may contain its own processor that communicates over the Internet over a wired or wireless connection, but it is unlikely to have a direct interface for receiving serial input into the media player 16.

In this embodiment, the touch controller 18 and the media player 16 communicate with one another over a network 40. This network may be the Internet. In order to associate a particular touch controller 18 with a particular display monitor 12, it is necessary to share some type of network identifier between the two devices. In one embodiment, this is accomplished by displaying a visual bar code such as a QR code 76. Menus available on the display monitor 12 and the touch controller 18 can force each to display a QR code that uniquely identifies either the device or its network address. A mobile device 15 operated by a store employee can read each bar code 76 within an app designed to link touch controllers 18 with media players 16, including media players 16 of the type built into the display monitor 12. The app can share this information with a server 70 that is accessible over the network. The server can then associate that display monitor 12 with that touch controller 18. Communications between the two devices can either pass through the server, or the server can provide the corresponding network addresses to the two devices to allow direct communications.

In other instances, a QR code 76 could be printed on one of the devices themselves, or on the packaging for the display monitor 12. The packaging may include a serial number for the television that uniquely identifies the television. If the server is able to identify a television communicating with it via the television's serial number, that is all the information that is required.

This same type of synchronization method could be used in less complicated environments. If, for instance, the media players 16 and touch controllers 18 in FIG. 6 all communicate across the same network, it will be necessary to match each media player 16 to a single touch controller 18. A QR code 76 printed on the media player 16 could identify its serial number (or MAC address or other unique identifier), and an app running on a mobile device 15 could read this code. The touch controller 18 could display its own QR code and the app (or a server) could take this data and communicate the pairing to the appropriate devices.

In other embodiments, the media players 16 can be programmed with store hours and be given the ability to turn on all associated televisions approximately 30 minutes before a scheduled store opening and then power them down 30 minutes after closing. The ability to control the power status of televisions is currently established as part of the HDMI-CEC protocol. This same ability can be used to ensure that the display monitors 12 remain on during store hours. To do this, the "on" command is sent by the media player 16 multiple times per hour to ensure display monitor 12 is powered on. If a display monitor 12 gets turned off manually, the media player 16 ensures that the TV will soon be turned back on.

Finally, in some embodiments the EDID (electronic display identification) received from the display monitor 12 by the media player 16 over the HDMI connector 14 is monitored (see FIG. 1). When the media player 16 determines that it is no longer connected to its old display monitor but rather has been connected to a new model, this information will be available to it through the EDID. If the media player 16 does not have current data and pricing information for this new model, the media player 16 can request this data from the price and TV spec server 72. This data can also be shared with the paired touch controller 18 so that the interface 36 of the touch controller 18 is also updated. In this way, the pairing between the media server 16 and touch controller 18 with a new display monitor 12 can be completely automated.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system comprising a television display assembly, each assembly comprising:
   a) a display monitor of a known make and model of a television, the display monitor have a display screen;
   b) a media player in communication with the display monitor, the media player having
      i) storage containing a plurality of audio-video program materials,
      ii) data indicating available sizes and a prices for each available size of televisions of the same make and model as the known make and model of the display monitor, and
      iii) a graphical processing unit for resizing audio video material;
   c) a touch controller in communication with the media player, the touch controller having screen size selection inputs and content selection inputs, each screen size selection input corresponding to a selected screen size selected from among the available sizes of television listed in the data, each content selection input corresponding to a selected audio-video program selected from among the plurality of audio-video program materials; and
   d) programming to
      i) resize the selected audio-video program based on the selected screen size selection input sent to the media player from the touch controller using the graphical processing unit,
      ii) locate the resized audio-video program into one corner of the display screen as a display presentation,
      iii) overlay on the display presentation a size indicator and a price indicator corresponding to the selected screen size,
      iv) present the display presentation and overlay onto the display screen, and
      v) provide for the creation of a plurality of variant borders, where in each of the plurality of variant borders correspond to one of the available sizes of televisions, the overlay including each of the variant borders for each of the available sizes of television.

2. The system of claim 1, wherein the overly includes variant border of the selected screen size and only those available sizes of television that are larger than the selected screen size and smaller than the display screen.

3. The system of claim 1, further comprising a plurality of mobile devices, each mobile device being in wireless communication with at least one of the media player and the touch controller; the mobile device configured to override commands sent from the touch controller to the media player.

4. The system of claim 3, wherein the television display assembly is a plurality of television display assemblies, each of the plurality of television display assemblies being connected to a computer network.

5. The system of claim 4, further comprising a server, the server is in communication with each of the media players of each of the assemblies, each media player obtaining periodic updates to the data and the plurality of audio-video program materials.

6. The system of claim 5, wherein the server is configured to send to each of the media players a sync signal, the sync signal being a command to the media player that causes each media player to provide each display monitor with an identical loop of synchronized video content selected from the plurality of audio-video programming materials in the absence of any commands from the touch controller.

7. The system of claim 6, each of the media players being configured to interrupt the sync signal for a predetermined period of time upon receipt of an input from the touch controller or one of the plurality of mobile devices.

8. The system of claim 7, wherein the programming further provides for one touch controller of one of the plurality of display assemblies to be provided with a comparison mode, wherein when the one touch controller is placed into the comparison mode the one touch controller is placed in communication with the media players of adjacent display assemblies.

9. A system comprising a plurality of television display assemblies, each assembly comprising:
   a) a display monitor of a known make and model of a television, the display monitor have a display screen;
   b) a media player in communication with the display monitor, the media player having i) storage containing a plurality of audio-video program materials,
ii) data indicating available sizes and a prices for each available size of televisions of the same make and model as the known make and model of the display monitor, and
iii) a graphical processing unit for resizing audio video material;

c) a touch controller in communication with the media player, the touch controller having screen size selection inputs and content selection inputs, each screen size selection input corresponding to a selected screen size selected from among the available sizes of television listed in the data, each content selection input corresponding to a selected audio-video program selected from among the plurality of audio-video program materials;

d) programming to
i) resize the selected audio-video program based on the selected screen size selection input sent to the media player from the touch controller using the graphical processing unit,
ii) locate the resized audio-video program into one corner of the display screen as a display presentation,
iii) overlay on the display presentation a size indicator and a price indicator corresponding to the selected screen size,
iv) present the display presentation and overlay onto the display screen, and
v) provide for the creation of a plurality of variant borders, where in each of the plurality of variant borders correspond to one of the available sizes of televisions, the overlay including each of the variant borders for each of the available sizes of television;

e) a network, each media player of each of the plurality of display assemblies in communication with the network;

f) a server, the server connected to each media player of each of the plurality of assemblies via the network, the server configured to send to each of the media players a sync signal, the sync signal being a command to the media player that causes each media player to provide each display monitor with an identical loop of synchronized video content selected from the plurality of audio-video programming materials in the absence of any commands from the touch controller.

* * * * *